United States Patent [19]

DiRienz

[11] Patent Number: 4,610,452
[45] Date of Patent: Sep. 9, 1986

[54] BELLEVILLE SEAL FOR SEALED BEARING ROTARY CONE ROCK BITS

[75] Inventor: Keith A. DiRienz, El Toro, Calif.

[73] Assignee: Smith International, Inc., Newport Beach, Calif.

[21] Appl. No.: 752,694

[22] Filed: Jul. 8, 1985

[51] Int. Cl.$^4$ .............................................. F16J 15/34
[52] U.S. Cl. ........................................ 277/83; 277/84; 277/92; 277/95; 277/166
[58] Field of Search ............ 277/81 R, 82-84, 277/92, 95, 166, 177, 186

[56] References Cited

U.S. PATENT DOCUMENTS

| 2,294,105 | 8/1942 | Wallgren | 277/84 X |
| 3,075,781 | 1/1963 | Atkinson et al. | 277/95 X |
| 3,096,835 | 7/1963 | Neilson | 277/95 X |
| 3,489,421 | 1/1970 | Neilson | 277/95 |
| 3,680,873 | 8/1972 | Garner | 277/9 |
| 4,428,588 | 1/1984 | Oelke | 277/83 |

Primary Examiner—Robert S. Ward
Attorney, Agent, or Firm—Robert G. Upton

[57] ABSTRACT

Sealed bearing rotary cone rock bits that utilize a standard belleville seal oftentimes require that the static side of the seal be secured to a junction formed between a shirttail portion and a journal of a leg of the rock bit. A metal ring on the static side of the belleville seal is secured to the junction between the journal and the shirttail portion of the leg and imposes a load on the inner diameter of an encapsulated belleville spring. By preloading the inner diameter of the belleville spring, the load on the spring continues to increase as the spring is deflected during use. The present invention utilizes an isolated encapsulated belleville spring such that the inner diameter of the belleville spring is not trapped between the metallic ring on the static side of the seal. The result is that as the deflection of the spring is increased under operating conditions, the load reaches a peak value and then begins to decrease. The belleville spring in the isolated state thus can endure large amounts of wear with little or no loss in load or contact pressure.

12 Claims, 6 Drawing Figures

STANDARD
PRIOR ART

ISOLATED

BELLEVILLE SEAL FOR SEALED BEARING ROTARY CONE ROCK BITS

BACKGROUND OF THE INVENTION

1. Field of the Invention

This invention relates to sealed bearing rotary cone rock bits that utilize a belleville seal to keep detritus out of the bearings and lubricant within the bearing surfaces during rock bit operation.

More specifically, this invention relates to a belleville seal wherein the inner diameter of the encapsulated belleville spring is isolated from the proposed static seal by means of an intervening metallic ring, the ring being secured to a junction formed between a journal bearing and a leg backface.

2. Description of the Prior Art

Prior art belleville springs utilize one or two belleville springs encapsulated within a rubberlike compound. The inner diametric portion of the belleville seal consists of a metallic ring that overlaps the inner diameter of the belleville spring such that the inner diameter of belleville springs are severely constrained during installation of the seal onto the journal bearing.

An example of this type of belleville seal is found in U.S. Pat. No. 3,489,421, assigned to the same assignee as the present invention. The patent discloses an annular seal that is affixed to one of two relatively rotatable members for creating a seal therebetween. The inner perimeter of the seal comprises a metal retaining ring having an interference fit on one of the parts to be sealed. Extending generally radially outwardly from the metal ring is a spring element which may comprise two or more belleville springs which are held by and connected to the retaining ring by a rubberlike compound bonded to the springs and to the retaining ring. The inner diametric static portion of the spring is tightly fitted upon a hub or journal bearing forming an interference fit. The metal ring is then spot welded to the hub to prevent rotation of the seal on the static side of the seal. The dynamic part of the seal is, for example, located adjacent the outer peripheral diameter of the seal; the dynamic face being formed between the outer diameter of the seal and the rotary cutter cone mounted to the journal.

U.S. Pat. No. 3,680,873, also assigned to the same assignee as the present invention, discloses a belleville seal for use between relatively rotatable parts and includes an inner annular ring of metal and an integrated outer annular seal element of yieldable material. The metallic ring forms the static portion of the seal. The ring is resilient and has a weakened point formed therein. The ring remains unbroken during the seal fabrication process wherein the elastomer is molded to the ring. The ring is separable at the weakened breakpoint when forced over an annular abutment on one of the relatively rotatable parts. The inner metal ring attached to the rubberlike material returns approximately to its original diameter after passing over the abutment. The resilient material is subjected to pressure deformations to tightly secure the resilient ring radially inwardly about the relatively rotatable part and axially outwardly against the abutment. After the inner metallic ring is forced over the abutment, the ring is partially metallurgically bonded (spot welded) to the journal bearing to prevent rotation of the inner static portion of the seal during operation of the bit in a borehole.

Both the '421 and '873 patents disclose an inner metallic ring that is securely attached to the journal bearing on the static side. The ring forms an annular lip that overlaps the inner diameter of the encapsulated belleville spring or springs. When the belleville seals are installed during the assembly process, the oversized resilient material is pressed into the junction between the journal bearing and the leg backface. The annular flange or lip of the metallic rings then traps or compresses the inner diameter of the encapsulated belleville springs, thereby placing the springs in a preloaded condition. Hence, during operation of the belleville seal, the springs, as they are deformed, increase in load, i.e., for an installed seal the load continues to increase through its entire range of deflection in the foregoing prior art devices.

The present invention isolates the belleville spring encapsulated within the seal material such that as the inner metallic static portion of the seal is affixed to the journal bearing, the encapsulated belleville spring is free to function without constraint induced by the preload.

SUMMARY OF THE INVENTION

It is an object of this invention to provide a belleville seal for a sealed bearing rotary cone rock bit wherein the belleville spring is isolated from a preload condition upon assembly of the belleville seals within the rock bit.

It is a further object of this invention to utilize a deflection range of the belleville spring beyond the point at which the belleville spring load will begin to decrease with further deflection, thereby maintaining a more uniform contact pressure of the dynamic seal face as the bit works in a borehole.

Moreover, as the dynamic belleville seal face wears, the contact pressure increases as the axial distance between the cone seal gland and leg backface increases, thus accommodating for a more liberal manufacturing tolerance as well as seal wear under rock bit operating conditions.

A rotary cone rock bit is disclosed wherein at least one belleville seal is disposed between a rotary cone and a journal bearing extending from a body of the rock bit. The belleville seal comprises inner and outer peripheral circumferences formed by the seal. A metal ring forms one of the circumferences. The ring is attached to a rubberlike compound, the other of the circumferences forms a resilient seal of the compound material. One of the peripheral circumferences forms a dynamic seal face.

A belleville spring is encapsulated within the compound and is radially disposed between the inner and outer peripheries. The spring is isolated from the static seal such that there is no preload of the belleville spring during installation of the seal in the rock bit. The belleville spring contained within the compound is deflected between a journal and the cone when installed. The amount of deflection is calculated to maintain the spring beyond the point wherein further deflection will result in lowering the load generated by the seal. The seal thus will maintain a constant load through small axial displacements of the rotating cone on the journal bearing. The belleville seal will increase its load as the dynamic seal surface wears, thus decreasing its deflection, against the rotating cone during rock bit operation.

The metal ring is fixed to the journal bearing, thereby forming a static portion of the belleville seal.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
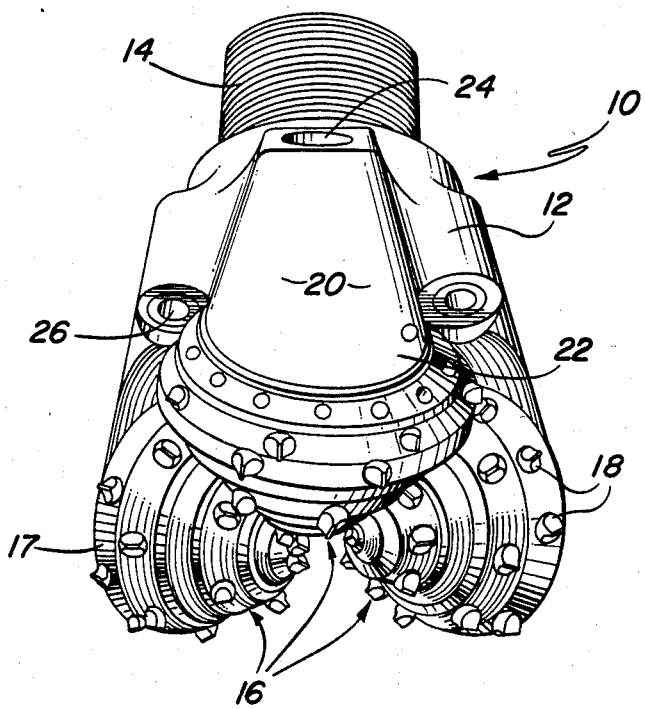
FIG. 1 is a perspective view of a typical three cone sealed bearing rock bit.

With reference now to FIG. 1, the sealed bearing rotary cone rock bit, generally designated as 10, consists of rock bit body 12, pin end 14 and a cutting end, generally designated as 16. Each cone 17, making up end 16, is attached to a leg 20 that terminates in a shirttail portion 22. Each of the cones 17 has, for example, a multiplicity of equally spaced tungsten carbide cutter inserts 18 interference fitted within the cone body 17. Three or more nozzles 26 communicate with a chamber formed inside the bit body 12 (not shown). The chamber receives drilling fluid or "mud" through the pin end 14. The fluid then is directed out through the nozzles 26 during bit operation. A lubrication reservoir 24 is provided in each of the legs 20 to supply lubricant to bearing surfaces formed between the rotary cones and their respective journals. A seal is provided between the rotary cones and the legs 20 to prevent detritus from entering the sealed bearing surfaces during operation of the rock bit in a borehole (not shown).

Figure 2:
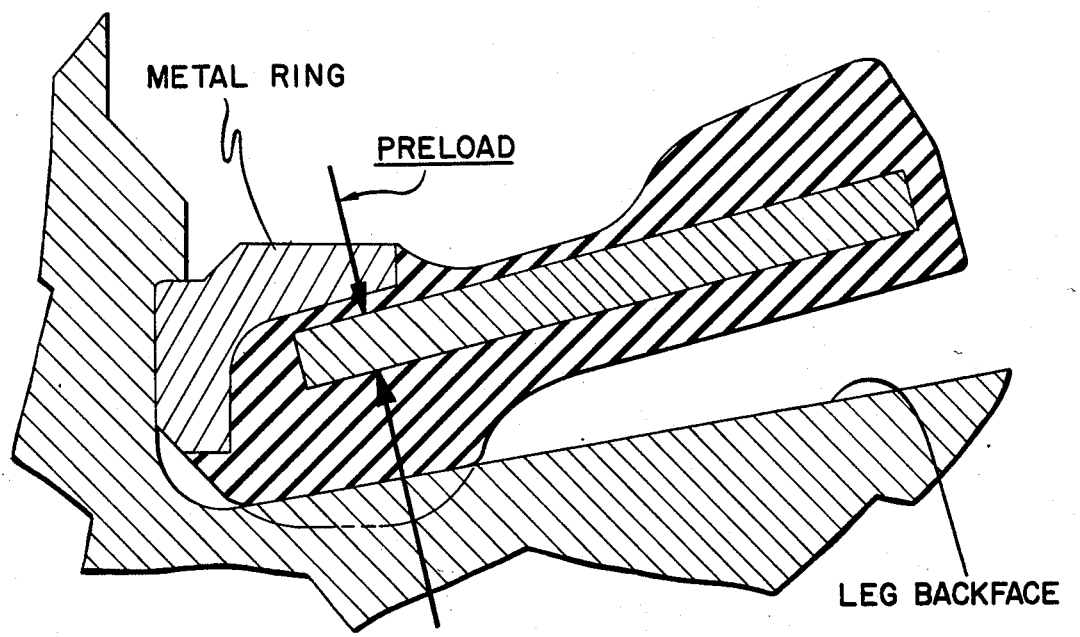
FIG. 2 is a prior art belleville seal, illustrating the preloaded belleville spring condition, i.e., the inner diameters of the encapsulated belleville spring being trapped between a metal ring and a leg backface.

Turning now to the prior art illustrated in FIG. 2, the previously described belleville seal encapsulates a belleville spring within a rubberlike compound. The inside diameter of the spring is trapped between the inner metal ring and the leg backface. The spring is rigidly held by the compressed elastomer between the leg backface and the flange of the metal ring such that the spring is in a preloaded condition.

Figure 3:
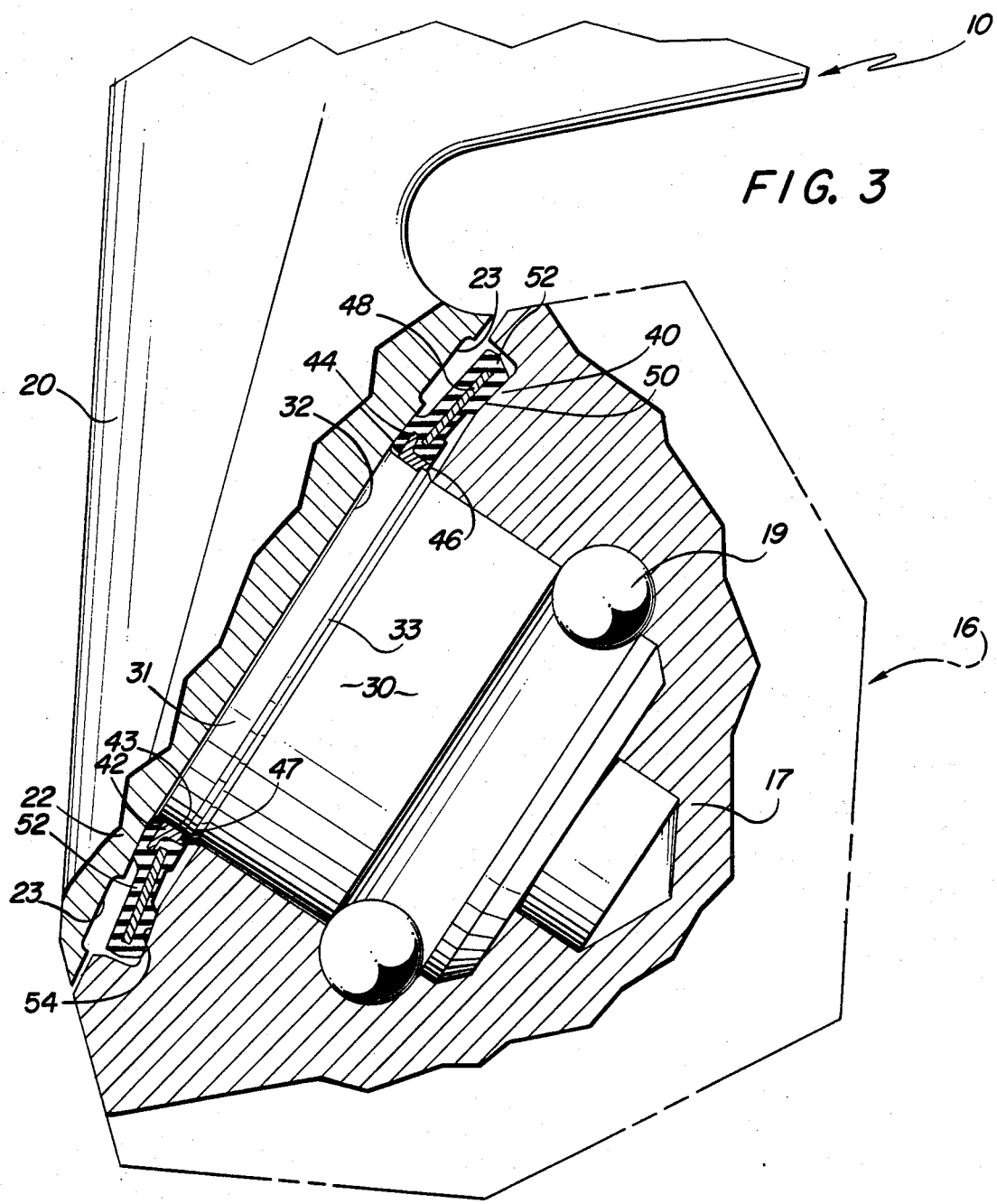
FIG. 3 is a partially broken away sectional view of a single cone, illustrating the preferred embodiment isolated belleville seal.

The partially broken away sectional view of FIG. 3 illustrates a bottom portion of a leg 20 of the rock bit 10, the leg 20 having a journal bearing, generally designated as 30, cantilevered from leg backface 32. The journal bearing has a ball race for cone retention balls 19 that serve to rotatably retain the cone 17 onto the journal bearing 30. An isolated preload belleville seal, generally designated as 40, consists, for example, of an inner, metallic static seal ring 42, an inside diameter of which forms an axially disposed surface 43. A flange 44 extends radially from surface 43. An annular lip 46 of the static seal ring extends over an annular ridge 33 formed on journal bearing 30. A belleville spring 48 is encapsulated within a rubberlike compound or resilient seal material 52. A typical encapsulation material would be nitrile rubber. The belleville spring is typically fabricated from heat treatable stainless steel. The seal material forms, at the outer peripheral portion of the belleville seal 40, a dynamic seal face 50. The radially disposed dynamic seal face 50 mates with a dynamic surface 54 formed in the cone 16. It would be obvious to eliminate the ridge 33 and provide an interference fit between ring 42 and the journal bearing 30 (not shown). The tightly fitted ring would then, for example, be metallurgically bonded to provide a static seal and to prevent the seal 40 from rotating during operation of the bit in a borehole.

During installation of the isolated belleville seal 40 against leg backface 32 of leg 20, the inner metallic ring 42 is forced over the raised ridge 33 on bearing 30 and snaps into place against the leg backface 32 within groove 31 formed on the journal bearing 30. The metal ring 42 has a weakened point that is separable when forced over ridge or abutment 33 in journal 30. The separated ends of the ring rejoin after the ring 42 clears ridge 33 (not shown). This technique is taught in U.S. Pat. No. 3,680,873 described elsewhere in this application. The metal ring is, for example, metallurgically bonded in one or more places to the journal bearing 30 adjacent ridge 33 and lip 46 of the belleville seal 40. As is illustrated, the belleville spring 48 is not under a preload condition and is free to move responsive to axial displacement of the cone toward or away from the leg backface 32. A radially disposed annular groove or channel 23 is formed in leg backface 32 to allow for axial deflection of the outer peripheral portion 52 of the seal and to prevent the belleville spring from reversing. The seal 40 then is securely positioned on the static side within annular channel 31 formed between the ridge portion 33 on the journal bearing 30 and the leg backface 32 of leg 20. The metal ring 42 is metallurgically bonded between lip 46 and annular ridge 33 to prevent rotation of the static portion of the seal during operation of the rock bit.

Figure 4:
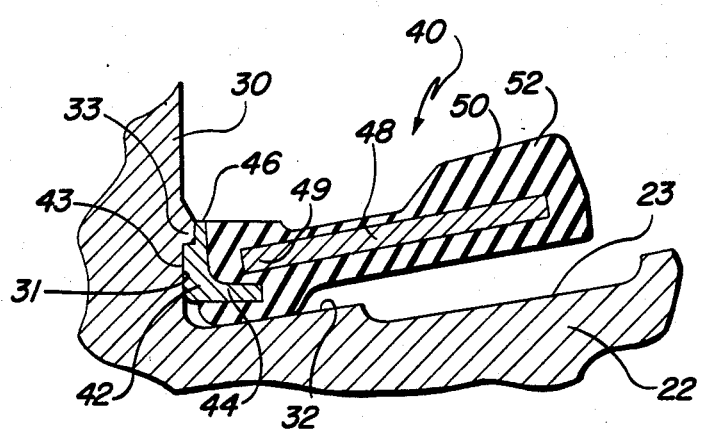
FIG. 4 is an enlarged cross section of an isolated preload belleville seal.

Turning now to FIG. 4, the enlarged view of the cross section of the isolated preload seal 40, depicts the seal locked within annular groove 31 formed between ridge 33 and leg backface 32. As previously described, the inside diameter annular ring 42 is forced over abutment 33 and snaps back into its annular configuration in groove 31. The lip 46 of the ring 42 provides an area for metallurgically bonding the ring to the journal bearing 30 (not shown). The belleville spring 48, being encapsulated within a nitrile rubber compound, has its inner diameter 49 supported by radially disposed flange 44 extending from metal ring 42. This support provides an ideal loading for the spring 48. The inside diameter 49 of the spring has a solid support provided by the flange 44 on the ring 42. The effect of this is that there is a larger moment arm acting on the isolated spring 48 when compared to a standard belleville wherein the inside diameter of the spring is trapped between the flange and the leg backface, as previously described. A radially disposed annular groove 23 is provided in the leg backface 32 to allow for deflection of the outer diameter portion 52 of the isolated preload spring 40. The depth of the annular groove 23 is configured to prevent the belleville spring 48 from inverting itself during operation of the bit in a borehole. The extra room provided by the channel 23, however, allows the spring to flex axially so that it operates properly during bit operation.

The belleville seal 40, when installed between the leg backface 32 and the cone 17 is deflected or stressed to a degree just beyond the point at which the conically shaped belleville spring 48 begins to reduce its load while still maintaining adequate contact pressure between the dynamic seal face 50 and sealing surface 54 in cone 17 (FIGS. 3 and 4).

Figure 5:
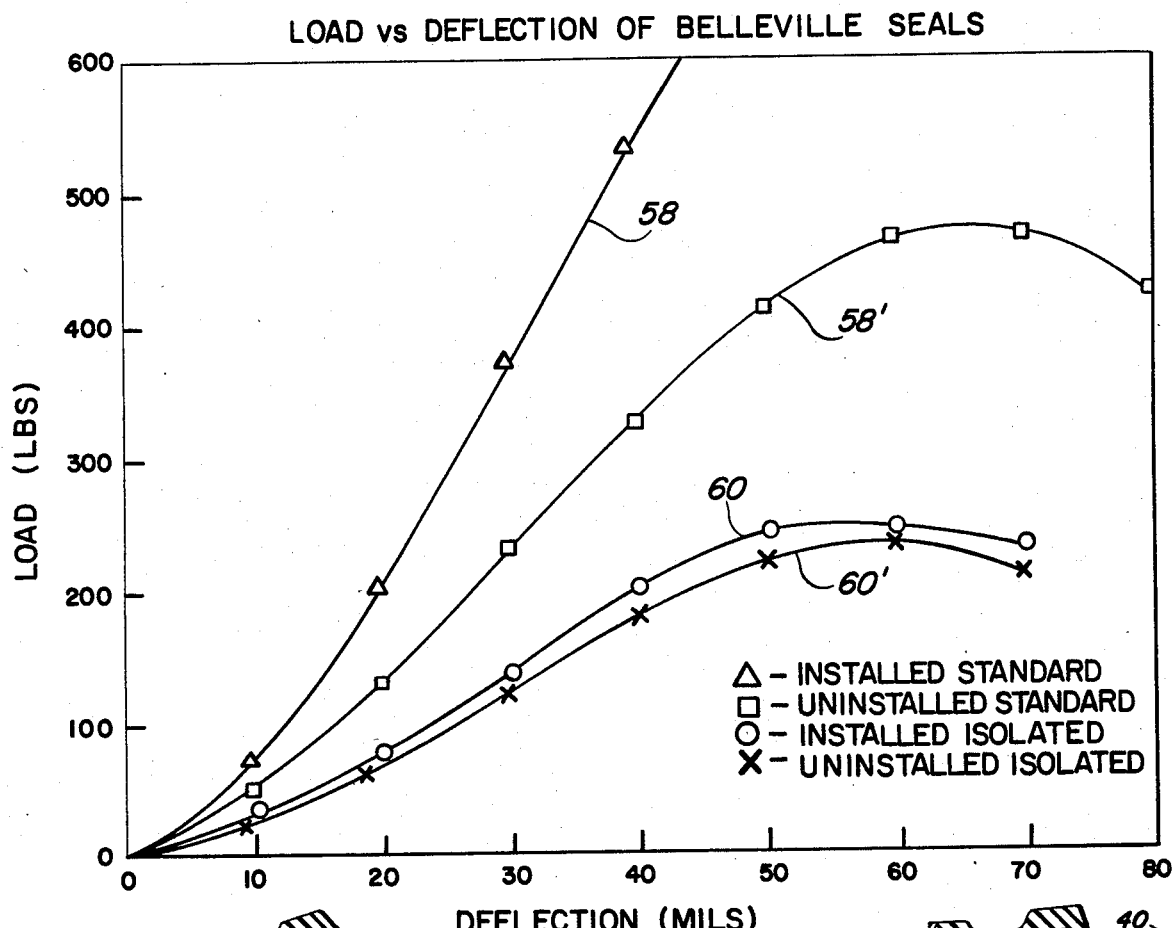
FIG. 5 is a load vs. deflection graph comparing standard preloaded belleville seals with isolated belleville seals having the same thickness; the seal deflection curves being shown both in the seal installed and uninstalled condition.

With reference now to the graph of FIG. 5, the load versus deflection of belleville seals is illustrated. The graph depicts both the standard prior art belleville seal and the isolated belleville seal, the subject of this patent application. The standard belleville is shown in both the installed and uninstalled conditions. The diamond symboled curve 58 illustrates a standard belleville seal in the installed condition. For example, the trace 58 shows that the standard seal spring continues to increase in load with axial deflection without significantly tapering off. The uninstalled standard belleville (indicated in the boxed line 58) shows, however, that with axial deflection the load tapers off with increased deflection. The isolated preload belleville spring, shown in the zero line indicated as 60, shows the installed isolated preload spring tapering off with deflection in a line that parallels the X'd line 60' of the uninstalled preload spring. Thus the spring used in the isolated preload seal 40 acts naturally whether it is in an installed or an uninstalled condition. This is clearly shown in the graph of FIG. 5.

Figure 6:
FIG. 6 is a load vs. deflection graph comparing the effects of dynamic seal face wear on the standard and isolated belleville seals.
Figure 6:
Figure 6:
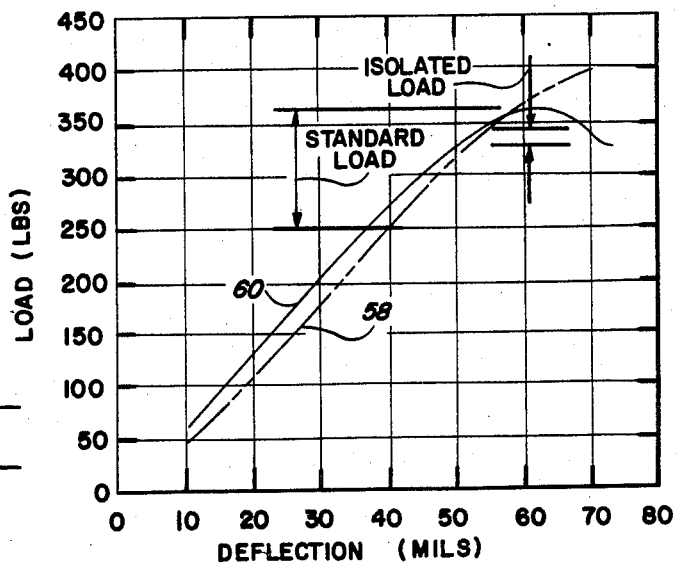

The graph of FIG. 6 shows a load versus deflection chart, again comparing the standard belleville prior art device with the new isolated preload belleville spring. This graph shows that the standard belleville curve 58 has a very high change of load with axial deflection of the standard spring. For example, a deflection between forty and sixty mils shows a load change from 250 pounds to over 350 pounds when the standard belleville is in the installed condition. The isolated preload belleville spring, indicated in curve 60, shows very little load change with deflection. For example, with a deflection between fifty and seventy mils there is only a ten to twenty pound load change. It is easily understood then why the standard belleville seal had a greatly reduced sealing capacity with a normal deflection of the cone as it axially moves on the journal bearing of a rock bit during bit operation.

The isolated preload seal 40, as previously indicated, is stressed to a degree just beyond the point at which the load begins to decrease (FIGS. 3 and 4), thus axial movement of the cone towards or away from the seal results in small load changes to the dynamic seal faces 50 and 54 formed on the seal 40 and the cone 17. When the sealing surfaces wear through prolonged operation of the rock bit in a borehole, the isolated belleville seal will have a greater deflection and the load will increase against the dynamic sealing surfaces. This is true because the belleville spring moves towards the point at which the spring will attain its maximum load, thereby effectively exerting a greater force or load on the dynamic sealing surfaces thus providing a seal even with worn and enlarged rock bit components.

The isolated preload seal 40 also provides a more ideal loading of the encapsulated spring 48. As indicated before, the inside diameter 49 of the spring 48 (FIG. 4) has a solid support provided by the flange 44 of ring 42 whereas the standard prior art seal supports the spring with a distributed elastic foundation (FIG. 2). The effect of this is that there is a larger moment arm acting on the isolated spring, thus reducing the load required to deflect it, as is clearly shown in FIG. 6.

In order to compensate for this phenomenon, a larger or thicker spring must be used in the isolated preload seal 40. The graph of FIG. 6 shows the comparison between the standard seal with, for example, a 0.025 inch thick spring and an isolated preload seal with, for example, a 0.032 inch thick spring. Both of these seals attain the desired load at the installed deflection prior to operation of the bit in a borehole. However, it should be noted that large load changes occur with the standard seal with axial deflection between the cone and the leg backface; again, clearly shown in FIG. 6. This is undesirable and results in reduced sealing capability. The isolated belleville seal 40 exhibits small load changes with axial deflection, resulting in longer seal life and constant seal pressures; thereby contributing to longer rock bit life.

It would, of course, be obvious to use multiple belleville springs encapsulated within the isolated preload seal without departing from the scope of this invention.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A rotary cone rock bit having at least one belleville seal disposed between said rotary cone and a journal bearing extending from a body of said rock bit, said belleville seal comprising:

inner and outer peripheral circumferences formed by said seal, a metal ring comprises one of said circumferences, said ring being attached to a rubberlike compound, the other of said circumferences forming a resilient seal of said rubberlike compound, one of said circumferences forming a dynamic seal face, at least one belleville spring is encapsulated within said compound being radially disposed between said inner and outer peripheries, said spring is isolated by said metal ring such that there is no preload of the belleville spring during installation of said seal in said rock bit, said belleville spring contained within said compound is deflected between a journal and said cone during installation such that the spring is maintained at a point beyond the maximum seal load, said spring thus will maintain a constant load through small axial displacements of the rotating cone on said journal, said belleville spring will increase its load through further axial displacement as said dynamic seal surface wears against said rotating cone during rock bit operation.

2. The invention as set forth in claim 1 wherein said metal ring is fixed to one of said rotary cone and journal bearing thereby forming a static portion of said belleville seal.

3. The invention as set forth in claim 2 wherein said metal ring forms a radially disposed flange that extends from said ring forming said static portion of said seal.

4. The invention as set forth in claim 3 wherein said metal ring is interference fitted to said journal bearing.

5. The invention as set forth in claim 4 wherein said metal ring is metallurgically bonded to said journal bearing.

6. The invention as set forth in claim 5 wherein said metal ring forms an inner peripheral circumference and is fixed to said journal bearing, said rubberlike compound forming a dynamic sealing surface at said outer peripheral circumference, said dynamic surface mates with a sealing gland formed by said rotating cone.

7. The invention as set forth in claim 6 wherein an inner diameter of said at least one belleville spring overlaps said radial flange extending from said metal ring such that the inner diameter of the spring is placed between said flange and said cone thereby isolating said belleville spring from any preload that may result from securing said metal ring to said journal bearing during installation of said belleville seal.

8. The invention as set forth in claim 1 wherein said rubberlike compound is nitrile.

9. The invention as set forth in claim 1 wherein said at least one belleville spring is prevented from a reversal by a leg backface surface formed in a leg extending from said body of said rock bit.

10. The invention as set forth in claim 9 wherein said leg backface surface forms an annular channel adjacent said at least one belleville spring, said channel allows for axial seal deflection within acceptable spring operating deflection ranges.

11. The invention as set forth in claim 1 wherein said at least one belleville spring is formed from metal.

12. The invention as set forth in claim 11 wherein said at least one belleville spring is formed from stainless steel.

* * * * *